United States Patent [19]

Unterhitzenberger

[11] Patent Number: 5,037,041
[45] Date of Patent: Aug. 6, 1991

[54] COCKPIT, ESPECIALLY FOR A HELICOPTER

[75] Inventor: Josef Unterhitzenberger, Kolbermoor, Fed. Rep. of Germany

[73] Assignee: Messerschmitt-Bölkow-Blohm GmbH, Munich, Fed. Rep. of Germany

[21] Appl. No.: 389,427

[22] Filed: Aug. 3, 1989

[30] Foreign Application Priority Data

Aug. 5, 1988 [DE] Fed. Rep. of Germany ....... 3826636

[51] Int. Cl.⁵ .................................................. B64C 1/00
[52] U.S. Cl. .................... 244/120; 244/117 R; 264/257
[58] Field of Search ............... 244/119, 120, 117 R; 264/257, 249; 114/357; 228/157

[56] References Cited

U.S. PATENT DOCUMENTS

| | | | |
|---|---|---|---|
| 4,053,126 | 10/1987 | Duret et al. | 244/119 |
| 4,294,419 | 10/1981 | Fouse et al. | 244/117 R |
| 4,304,376 | 12/1981 | Hilton | 244/117 R |
| 4,471,020 | 9/1984 | McCarthy | 264/257 |
| 4,531,695 | 7/1985 | Swinfield | 244/119 |
| 4,863,771 | 9/1989 | Freeman | 264/257 |
| 4,867,922 | 9/1989 | Zaccato | 264/257 |

FOREIGN PATENT DOCUMENTS

| | | |
|---|---|---|
| 2642523 | 3/1978 | Fed. Rep. of Germany . |
| 3438602 | 4/1986 | Fed. Rep. of Germany ... 244/117 R |
| 1594423 | 7/1981 | United Kingdom . |

OTHER PUBLICATIONS

Ford et al., Final Report Advanced Composite Air Frame Program, Sep. 1977-May 1980, pp. 45-55; 344-367.

Primary Examiner—Joseph F. Peters, Jr.
Assistant Examiner—Christopher P. Ellis
Attorney, Agent, or Firm—Kenyon & Kenyon

[57] ABSTRACT

In order to obtain in a cockpit for a helicopter which is provided with a support frame work consisting of hollow profile parts dimensionally stiffly connected to each other and defining the door and window cutouts of the cockpit and an outer covering and is usually fabricated for cost reasons in view of the relatively limited lot sizes of aircraft in differential design to obtain not only a more weight-saving but also overall a more cost effective cockpit design, at least the hollow profile parts extending around the cockpit cutouts are made as an integral, spatially closed support profile structure such that they are formed and hardened together from composite fiber material or superplastically deformable metal in a forming tool having the forming surfaces with the profile shape of the hollow profile parts around to the cockpit cutouts.

10 Claims, 4 Drawing Sheets

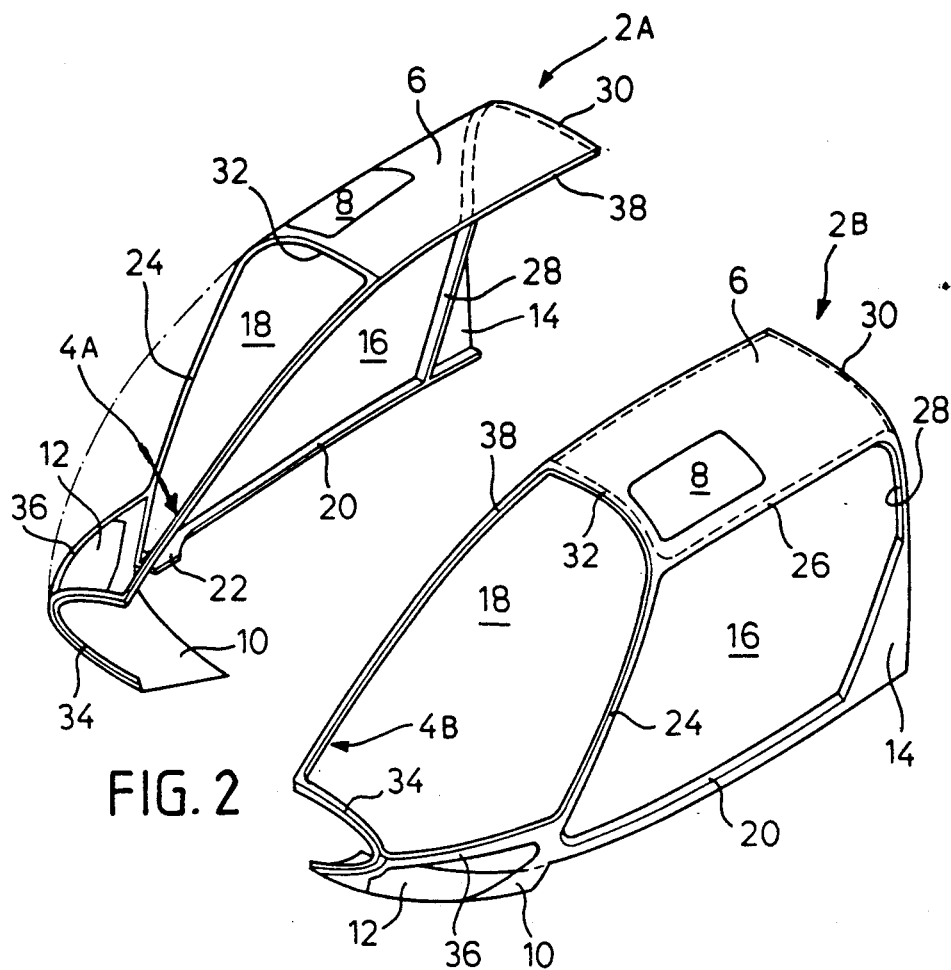
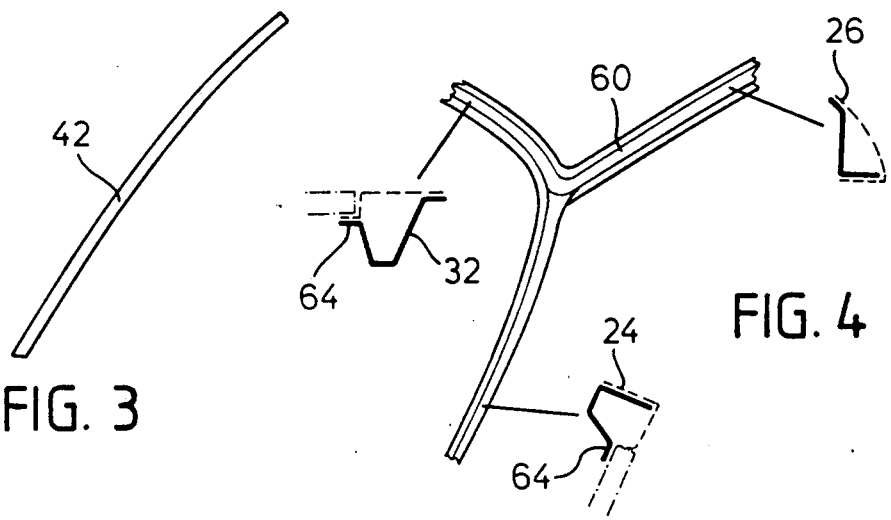
FIG. 2
FIG. 3
FIG. 4

COCKPIT, ESPECIALLY FOR A HELICOPTER

BACKGROUND OF THE INVENTION

The present invention relates to a cockpit, especially for a helicopter.

It is known to design the supporting frame parts of the cockpit for weight reasons in lightweight design from composite fiber or from also hollow metal profiles, where the cost-effective manufacture of the cockpit frame is achieved, taking into consideration the relatively limited lot sizes of aircraft, by the provision that the individual hollow profile parts are formed and hardened separately from each other and are then put together as the finished support frame via stiff joints. The manufacturing tolerances resulting from this process are compensated in the installation of the cockpit front panes and doors, cf which, especially in the manufacture of helicopters, require high fitting accuracy at the frame parts defining the corresponding cockpit cutouts, where the extra cost required therefor is tolerated intentionally in view of the cost and weight advantages otherwise achieved with this manufacturing method.

SUMMARY OF THE INVENTION

It is an object of the present invention to provide a cockpit of the type mentioned above such that, both weight and costs for the cockpit are reduced, even when the lot size limitations common for aircraft are taken into consideration.

The above and other objects of the invention are achieved by a cockpit, especially for a helicopter, comprising a support frame work delineating and window cutouts and provided with an outer covering, the support frame comprising frame parts connected to each other in stiff relationship, at least the frame parts extending around a door cutout of the and the stiff connections between said frame parts being an cockpit integral, spatially closed support profile structure such that they are formed together of composite fiber material or superplastically formable metal in a forming tool with the profile shape of the support frame parts around the formed areas corresponding to the door cutout, and are hardened.

Through the claimed design of the frame parts extending at least about the cockpit door cutout as integrally manufactured in a forming tool supporting profile structure of composite fiber material or superplastically deformed metal, the overall weight of the cockpit, as was to be expected, is lowered because separate, weight-increasing joints such as screw joints or rivet joints, between the individual frame parts are eliminated, but surprisingly the extra cost due to the integral manufacture is more than compensated even at relatively small cockpit quantities by the fact that the otherwise incurred secondary costs for fitting the cockpit doors (and windows) not only in the first assembly, but also in the case of a later overhaul, are saved.

With the invention, an accurately fitted design of the support frame work in the region of the cockpit cutouts and thereby full interchangeability of the doors (and windows) becomes practical also under cost aspects even for the customary small series production.

A further important aspect of the invention is that the integral support profile structure has, in view of productionwise optimum material utilization and weight-saving, a hollow profile cross section, and specifically, preferably in the form of a closed hollow profile.

In order to produce the integral support profile structure in a simple manner when forming and hardening in the forming tool with such a hollow profile cross section, the interior of the hollow profile is advantageously filled with a honeycomb, foam material or pressure hose support core. Alternatively, however, it is also possible, to insert prefabricated form-stable partial profile elements of the same material as the support frame structure to be manufactured into the forming tool which, keeping the hollow profile interior together with the material formed at the forming surfaces of the forming tool (composite fiber material for superplastic metal) are hardened to form the integral support profile structure, whereby, for one, the manufacturing costs and the weight, even though small, for the inner hollow profile support core are eliminated and secondly, a relatively simple forming tool is sufficient for an integral support profile structure with a complicated hollow profile cross sectional shape.

In a particularly preferred manner, the outer covering of the cockpit is formed and hardened at the same time for production reasons together with the support profile structure in the forming tool and furthermore, the support profile structure comprises at least two cockpit cutouts including the door cutout. The advantages of the design according to the invention are demonstrated especially clearly in a helicopter cockpit with a support post arranged between two front window cutouts of the cockpit in the center plane of the cockpit. Such a cockpit is assembled from two cockpit halves which have mirror symmetry with r to the central plane of the cockpit and are designed each as an integral support profile structure.

BRIEF DESCRIPTION OF THE DRAWINGS

The invention will be described in greater detail in the following detailed description with reference to the drawings, in which:

FIG. 2 shows the helicopter cockpit according to FIG. 1 prior to assembly;

FIG. 3 shows a connecting strap, by which the two cockpit halves according to FIG. 2 are assembled along the central post;

FIG. 4 shows a preformed support frame element which, when forming the cockpit half to the right in FIG. 2 is inserted into the forming tool at the same time, with the corresponding profile cross sections;

DETAILED DESCRIPTION

Figure 1:
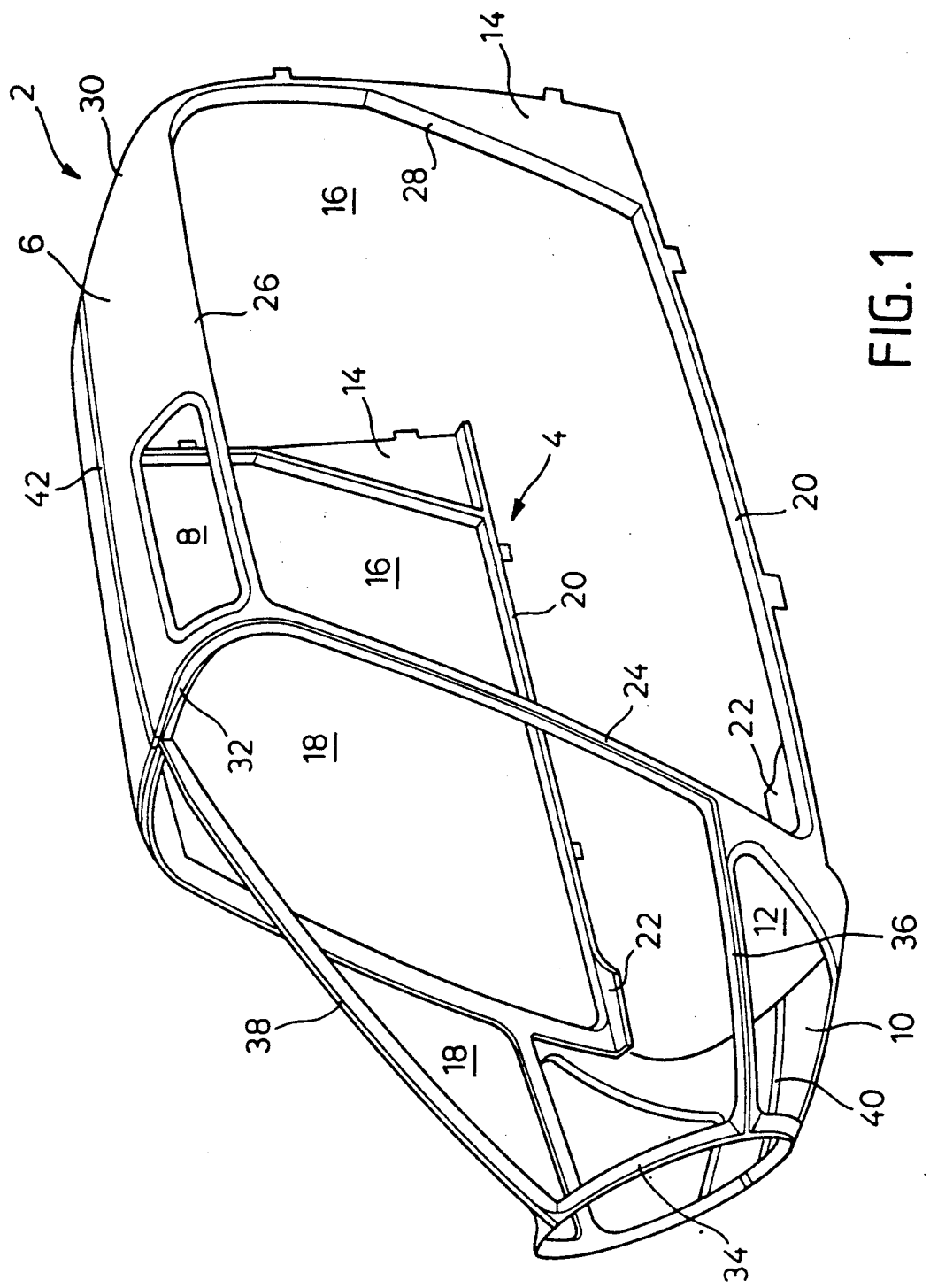
FIG. 1 shows a perspective view of a helicopter cockpit in the assembled condition.

With reference now to the drawings, the cockpit 2 shown in FIG. 1 which is fastened on the back side to the central fuselage and on the lower side to the bottom shell (both not shown) of a helicopter contains as the main components a support frame work which is stiff with respect to operational loads and is designated overall with 4, as well as an outer covering integrally formed at the support frame parts which consists of a roof covering 6 which is provided with recesses 8 for the roof windows, as well as a bottom covering 10 which adjoins the bottom shell of the helicopter and is provided with recesses 12 for the bow windows, and of lateral covering parts 14 at the rear end of the cockpit.

The support frame 4 is formed by composite fiber hollow profiles which bound the door cutouts 16 as well as the front pane cutouts 18 of the cockpit 2 with high fitting accuracy, whereby complete interchageability of the doors and the front panes is ensured.

As is shown in FIG. 2, the cockpit is put together of two cockpit halves 2A and 2B with mirror symmetry which are designed as a hollow profile structure 4A and 4B, respectively, which are integral including the corresponding covering parts.

In detail, each hollow profile structure 4A and 4B consists of a lower door frame member 20 which is provided at the forward end with an integrally formed pad 22 for fastening the cockpit 2 to the bottom shell of the helicopter; a door post 24 adjoining thereto which forms at the same time the lateral boundary for the front pane; an upper and a back, bent-off door frame member 26 and 28 respectively which are adjoined by a rear roof frame member 30 for fastening to the central fuselage of the helicopter, and a forward roof frame member 32 which forms the upper front pane boundary, as well as a semiannular bow frame part 34 which is integrally joined to the door post 24 via a side frame member 36 and together with the latter and a central post part, 38 extending from the bow frame part 34 via the forward to the rear roof frame member 32, 30 bounds the front panel cutout 18 of the support frame structure 4A and 4B, respectively.

The two cockpit halves 2A and 2B are put together by a connecting strip 40 along the bottom covering parts 10 as well as by a connecting strap 42 (FIG. 3) which is cemented and/or riveted to over the entire length thereof the central post parts 38, the two bow frame parts 34 together forming the forward ring span for the bow cap of the cockpit and the two central post parts 38 forming the central post extending from the ring span to the rear end of the cockpit, separating the two front panes of the cockpit from each other.

Figure 5:
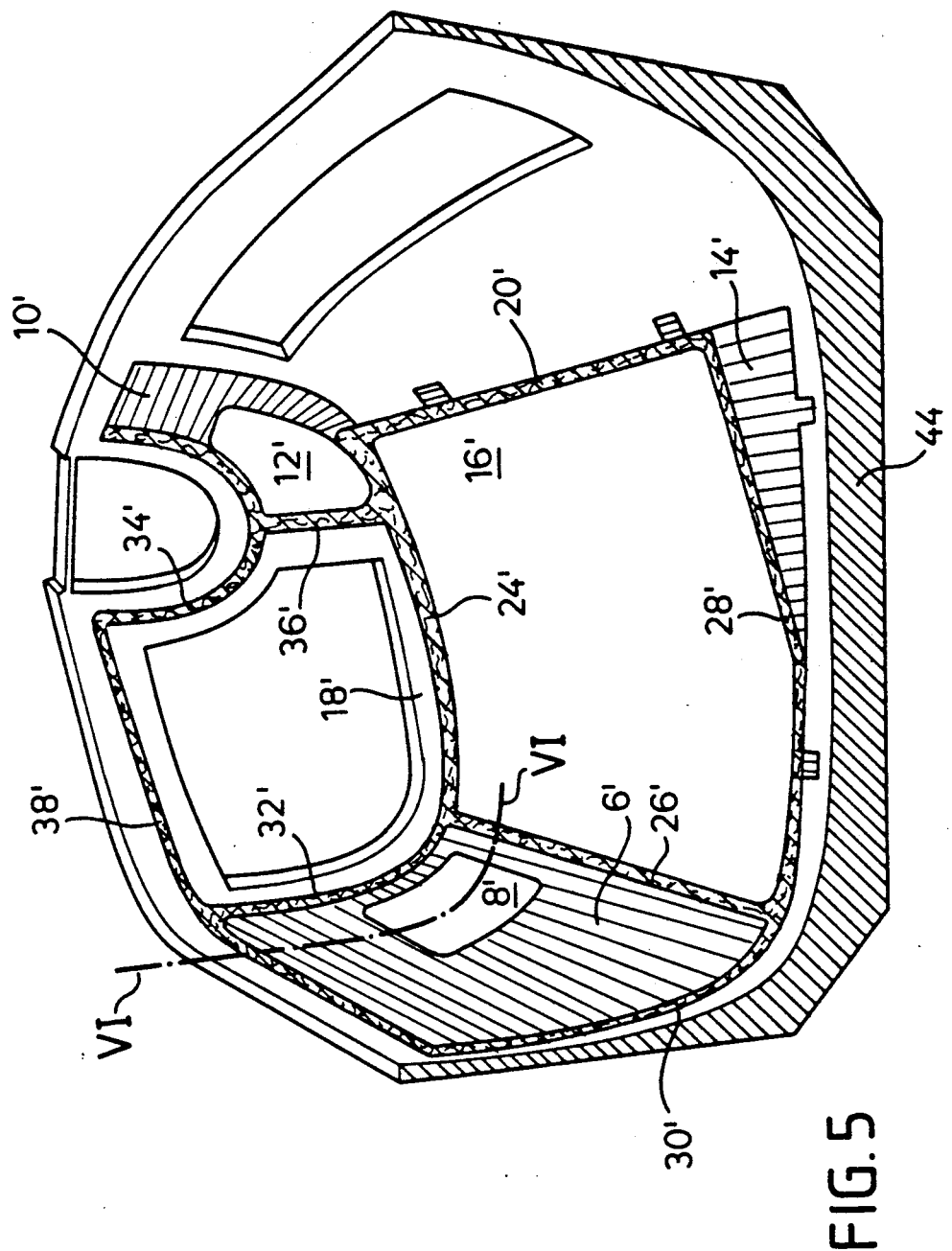
FIG. 5 shows a simplified perspective view of the forming tool of the cockpit half to the right according to FIG. 2.

The mentioned frame parts of the two integral support profile structures 4A and 4B are each designed as hollow profiles with a closed cross section with a cross section configuration which changes depending on the function of the respective hollow profile parts and is formed together with the covering parts in a forming tool 44 (FIG. 5) into a monolithic cockpit half and are hardened, FIG. 5 showing the forming tool 44 for the right hand cockpit half 2B. The individual, integrally connected hollow profile parts of the support frame structure 4B are formed and hardened at the corresponding cross-hatched surface areas, designated by a prime, however, of the forming surface of the forming tool 44, the inner contour of which corresponds to the outside contour of the cockpit half to be fabricated while for the covering parts integrally formed at the support frame structure, the forming surface areas of the forming tool 44 are likewise designated correspondingly but are provided with the prime. The forming tool 44 is made complete by the form pieces 46, 48, 50, not shown in FIG. 5 for the sake of clarity, but shown in FIG. 6, which form the forming surfaces for bounding the edges of the hollow profile and covering parts, respectively.

The method of manufacturing the integral structure will be explained in detail with reference to the partial cross section shown in FIG. 6:

In this manner, the rectangular hollow profile of the central post part 38 is made by means of a foam material support core 52 which is wrapped with the composite fiber laminate.

For bounding the edge of the hollow profile 38, a form piece 46 is fastened to the forming tool 44, where the setback at the hollow profile 38, required for a flush assembly of the connecting strap 42, is achieved by the T-shaped design of the form piece 46.

The roof covering 6 is formed integrally adjacent the hollow profile 38. For larger area covering parts or such with more stringent strength requirements, for instance, for step-proof design, a sandwich design is chosen such as is shown in the upper part of FIG. 6 for the roof covering section 6.1. For this purpose, a honeycomb core 54, in the simplest case of paper, is laminated between an upper and a lower composite fiber layer 56, 58.

Figure 6:
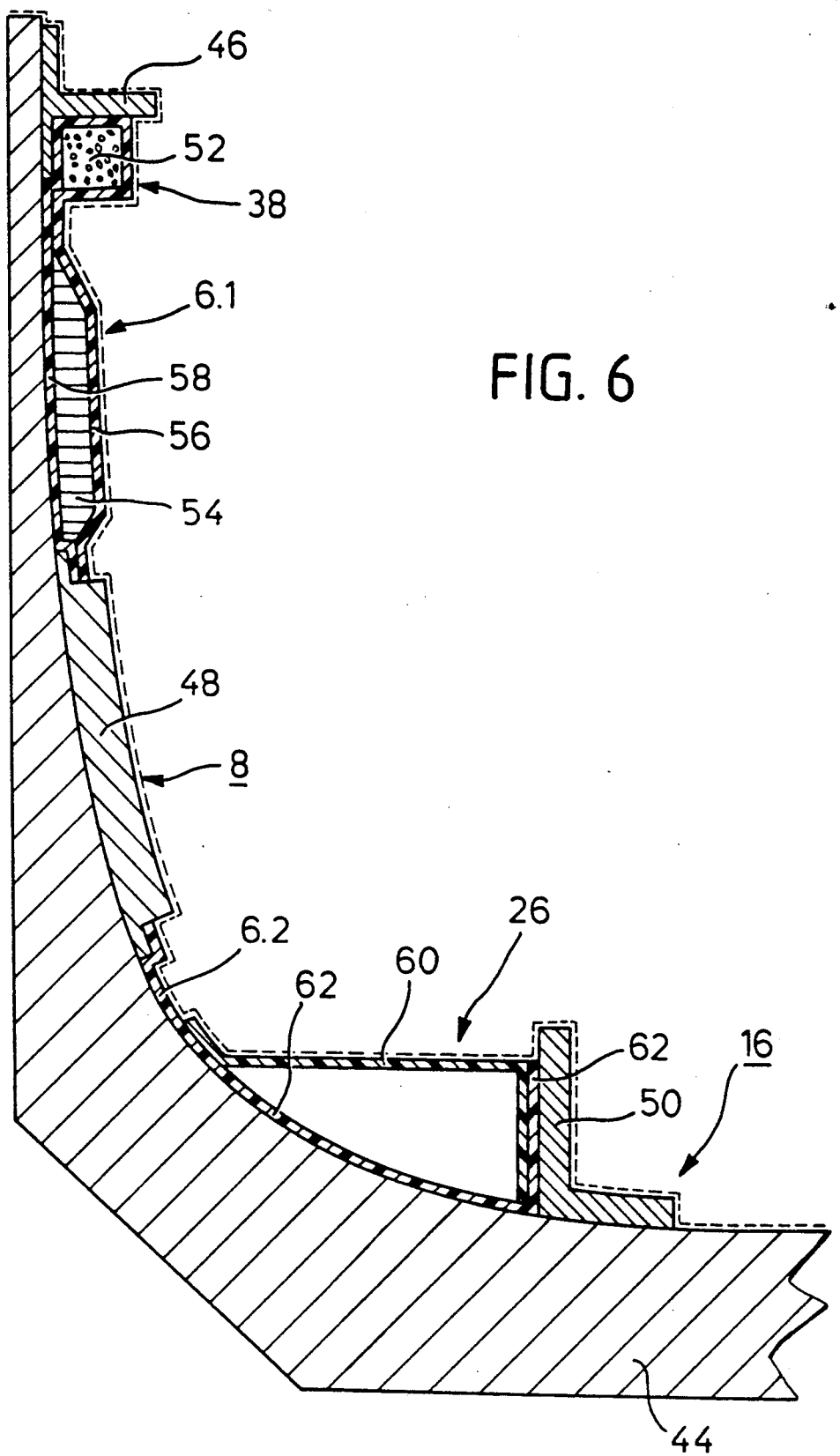
FIG. 6 shows a partial cross section of the forming tool shown in FIG. 5 along the line VI—VI after it is provided with the form pieces not shown in FIG. 5.

In the region of the window recesses of the covering parts, form pieces such as the form piece 48 for the roof window recess 8 are fastened to the forming tool 44 according to FIG. 6. By a suitable edge design of these form pieces the setback at the window recesses required for the flush assembly of the window pane is achieved.

As can be seen from FIG. 6, for the lower roof covering section 6.2, covering parts of less area which are stressed more or less, are constructed of a pure composite impregnated fiber of relatively small wall thickness. The hollow profile adjoining the roof covering section 6.2 for the upper door frame span 26, for which a form piece 50 is again provided with a forming surface, at which the edge of the door frame span 26 bounding the door cutout 16 of the cockpit is made with an accurate fit, is made without an inner support core by the provision that a preformed, dimensionally stable but not yet completely hardened support frame element 60, the cross section of which corresponds to part of the hollow profile 26, is inserted at the same time into the form, where the remaining part of the hollow profile 26, is formed by the impregnated layers 62 placed against the forming surfaces of the forming tool 44 or the form piece 50.

Such a composite fiber profile element 60, with the aid of which not only the hollow profile 26 but also the door and forward roof frame hollow profiles 24, 32 are formed, is shown in FIG. 4 in the form of a three-armed one-piece part, together with the corresponding profile cross sections which are formed, for one, by the preformed profile element and secondly, by the composite fiber laminate which is hardened completely simultaneously with the former and is placed against the forming surfaces of the forming tool (shown dashed in FIG. 4).

As can be seen likewise from FIG. 4 for the hollow profiles 24 and 32, the integral support frame structure surrounding the front pane cutout 18 with an accurate fit (similarly to the window cutouts of the covering parts) has a set-back profile rib 64 by which installation flush with the outer skin or replacement of the front pane (shown dashed-dotted in FIG. 4) without complicated fitting work is substantially facilitated.

Returning to FIG. 6, the composite fiber material, after covering the forming tool, is enclosed in a vacuum foil (shown dashed in FIG. 6) and is then hardened in an autoclave under the action of pressure and heat, where the forming space existing between the forming tool 44 and the vacuum foil is evacuated at least at the beginning of the hardening process. After the hardening process, the entire half of the cockpit is finished as an integral composite fiber structure with high accuracy. Also the second half cockpit 2A is made similarly and both cockpit halves are then assembled in the manner described above and make possible full exchangeability of the front panes and cockpit doors.

The two cockpit halves can be fabricated by the same manufacturing method and construction (except for differences relating to the material) optionally also of superplastically deformed metal, as respectively integral structural units.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A cockpit, especially for a helicopter, comprising a support framework delineating door and window cutouts of the cockpit and provided with an outer covering, the support framework comprising frame parts connected to each other in stiff relationship, at least selected frame parts extending around the door and window cutouts of the cockpit being an integral, spatially closed support profile structure such that the structure including the frame parts and stiff connections therebetween, is formed and hardened as a unitary member of at least one of composite fiber material and superplastically formable metal in a forming tool having the profile shape of the support frame parts around the formed areas corresponding to the door and window cutouts, the outer covering comprising a covering formed at the same time as the support profile structure and hardened as a integral component of the same material as the support profile structure and together with the support profile structure in the forming tool, the support profile structure being capable of supporting static and dynamic loads applied to the cockpit independently from the outer covering.

2. The cockpit recited in claim 1, wherein the profiled support structure has a hollow-profile cross section.

3. The cockpit recited in claim 2, wherein the profiled support structure has a closed hollow-profile cross section.

4. The cockpit recited in claim 2, wherein the interior of the hollow profile comprises a honeycomb material support core.

5. The cockpit recited in claim 3, wherein the interior of the hollow profile comprises a honeycomb material support core.

6. The cockpit recited in claim 1, wherein the profiled support structure includes at least one pre-formed support frame element inserted into the forming tool at the same time as the support structure and which also comprises at least one of the composite fiber material and superplastically formable metal.

7. The cockpit recited in claim 1, wherein the integral profiled support structure each comprises at least two cockpit cutouts including the door cutout.

8. The cockpit recited in claim 1, having a support arranged between two front window cutouts of the cockpit in the central plane of the cockpit wherein the cockpit is assembled from two cockpit halves which have mirror symmetry to the central plane of the cockpit and are designed as integral profiled support structures.

9. The cockpit recited in claim 2, wherein the interior of the hollow profile comprises a foam material support core.

10. The cockpit recited in claim 3, wherein the interior of the hollow profile comprises a foam material support core.

* * * * *

UNITED STATES PATENT AND TRADEMARK OFFICE
CERTIFICATE OF CORRECTION

PATENT NO. : 5,037,041

DATED : August 6, 1991

INVENTOR(S) : Josef Unterhitzenberger

It is certified that error appears in the above-identified patent and that said Letters Patent is hereby corrected as shown below:

Column 1, line 19, change "cf" to --of--.

Column 1, line 34, change "delinesting" to --dilineating door--.

Column 1, line 38, change "of the" to --of the cockpit--.

Column 1, line 39, change "an cockpit integral," to --an integral--.

Column 2, line 33, change "r" to --respect--.

Column 3, line 29, change "part," to --part--.

Column 4, line 46, change "Such a" to --Such a performed--.

Column 4, line 48, change "door" to --door post--.

Signed and Sealed this

Twenty-fourth Day of August, 1993

*Attest:*

BRUCE LEHMAN

*Attesting Officer*     *Commissioner of Patents and Trademarks*